United States Patent [19]

Bernard et al.

[11] Patent Number: 5,248,808
[45] Date of Patent: Sep. 28, 1993

[54] VINYL FUNCTIONAL REACTIVE TACKIFIERS FOR PRESSURE-SENSITIVE ADHESIVES

[75] Inventors: Margeret M. Bernard, La Verne; Sebastian S. Plamthottam, Upland, both of Calif.

[73] Assignee: Avery Dennison Corporation, Pasadena, Calif.

[21] Appl. No.: 912,316

[22] Filed: Jul. 13, 1992

Related U.S. Application Data

[62] Division of Ser. No. 429,975, Nov. 1, 1989, Pat. No. 5,130,375.

[51] Int. Cl.$^5$ .................. C07C 271/02; C07C 271/06
[52] U.S. Cl. .................................. 560/160; 525/278; 525/289; 525/308; 427/208.4
[58] Field of Search .......................................... 560/160

[56] References Cited

U.S. PATENT DOCUMENTS

| | | |
|---|---|---|
| 2,607,711 | 8/1952 | Hendricks . |
| 3,499,915 | 3/1970 | Schwander et al. ............... 560/160 |
| 4,178,407 | 12/1979 | Rubens ............................... 428/288 |
| 4,309,524 | 1/1982 | Huemmer et al. .................. 526/284 |
| 4,582,855 | 4/1986 | Kam et al. ........................... 560/160 |
| 4,886,853 | 12/1989 | Foster et al. ....................... 524/476 |
| 5,087,686 | 2/1992 | Ansell et al. .......................... 528/49 |

FOREIGN PATENT DOCUMENTS 59-18774  1/1984  Japan .

*Primary Examiner*—Vasu S. Jagannathan
*Attorney, Agent, or Firm*—Christie, Parker & Hale

[57] ABSTRACT

There are synthesized certain polycylic-vinyl reactive tackifiers for acrylic based pressure-sensitive adhesive polymers. The compounds have reactive pendant vinyl groups which copolymerize and graft to the adhesive polymer by means of UV or EB radiation. There are also provided novel pressure-sensitive adhesive compositions containing such reactive tackifiers.

3 Claims, No Drawings

VINYL FUNCTIONAL REACTIVE TACKIFIERS FOR PRESSURE-SENSITIVE ADHESIVES

This is a division of application Ser. No. 07/429,975, filed Nov. 1, 1989, now U.S. Pat. No. 5,130,375.

BACKGROUND OF THE INVENTION

It is a common practice in pressure-sensitive adhesive applications to use additive resins to modify the adhesive properties, and patent literature abounds in the same. Most of the prior art teaches the use of resins such as rosin esters, terpene phenolic resins, hydrocarbon resins, and the like, to improve certain properties of the pressure-sensitive adhesive, such as peel adhesion. The improvement in peel adhesion is normally achieved at the expense of high temperature shear holding power and/or high shear adhesion failure temperature (SAFT). Most of the resins are nonreactive with the polymer and have a tendency to migrate on long term aging or degrade unless anti-oxidants are added, antioxidants also have a tendency to alter the properties originally intended for the pressure-sensitive adhesive composition.

Japanese Patent Publication 8418774 (Hitachi Chemical Co.) discloses the use of radiation curable tackifiers in acrylic pressure-sensitive to provide high initial adhesive and cohesive strengths. The patent teaches the use of glycidyl methacrylate modified rosin acids and terpene phenolic resins which can be made to cross-link by irradiating with electron beam radiation. No mention was made of the shear performance at elevated temperatures. The modification reaction is different from the subject of this invention.

U.S. Pat. No. 4,380,513 to Ruckel et al. deals with the preparation of inert rosin esters by reacting lower aliphatic saturated carboxylic acids, anhydrides and acid chlorides with the hydroxide groups of the rosin ester. The product of the reaction is inert in that it does not carry any copolymerizable reactive functionality.

U.S. Pat. No. 4,377,513 to Ruckel et al. discloses the use of a urethane modified rosin ester of primary polyhydric alcohol as a tackifier for polar elastomer adhesives such as polyurethanes. According to the patentees, a polyhydric alcohol was esterified (50–95% with rosin acid and the remaining hydroxy groups reacted with phenyl isocyanate or toluene di-isocyanate. The tackifier does not have vinyl functionality and is not intended for use with pressure-sensitive adhesives.

U.S. Pat. No. 4,418,120 to Kealy et al. discloses tackified, chemically cross-linked acrylic pressure-sensitive adhesives. The polymer used in the adhesive has very high precure molecular weight with an inherent viscosity of 0.75–1.5 dl/g to accommodate high levels of tackifying rosin esters. The formulated adhesive contains select antioxidants to prevent the aging of the tackifier. The tackifiers used are again nonfunctional.

U.S. Pat. No. 4,726,982 to Traynor et al. teaches N-vinyl-2-pyrrolidone containing acrylic pressure-sensitive adhesives, which when mixed with tackifying resins such as rosin esters, alkylated styrenes, and the like, and on UV curing, give improved adhesion to high solids automotive paint systems. The resins do not have vinyl functional groups as revealed in the present invention and high amounts of (>10%) N-vinyl pyrrolidone is copolymerized to achieve the desired properties.

SUMMARY OF THE INVENTION

The present invention provides pressure sensitive adhesives having excellent high-temperature performance and peel adhesion by use of an acrylic based pressure sensitive adhesive polymer in combination with a reactive tackifier resin which, on curing with electron beam or actinic radiation such as UV radiation crosslinks or grafts with the acrylic polymeric backbone to provide high adhesive and cohesive strengths with excellent high temperature performance.

The reactive tackifiers of this invention has the general formula:

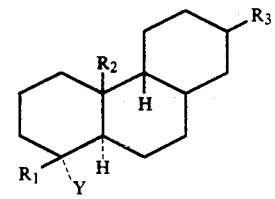

wherein rings 2 and 3 are independently saturated or unsaturated; $R_1$ and $R_2$ are independently-H or an alkyl group containing from 1 to about 4 carbon atoms, $R_3$ is isopropyl and Y is a pendant vinyl unsaturated organo group having the general formula:
$CH_2=C(R_4)-Z$ where
$R_4=-H, -CH_3$ and
$Z=-COO-CH_2-$; $-COO-CH_2-CH_2-NH-COO-CH_2-$; $-COO-CH(CH_2O)_2-(CO)_2-$; $-COO-(CH_2-CHR_5-O)_n-CO$; or $-COO-CH_2-CH_2-NH-CO-NH-$; and where
$R_5=-H$ or $-CH_3$.

The reactive tackifier is typically present in an amount up to about 50% by weight of the polymer and tackifier and preferably in the range of 10–20%, the optimum amount being dependent on the type of the polymer used. It may be interpolymerized with the monomers forming the polymer or grafted to the polymer.

DETAILED DESCRIPTION OF THE INVENTION

The present invention provides reactive tackifiers for pressure-sensitive adhesives and resultant pressure-sensitive adhesives having excellent high-temperature performance and peel adhesion by use of an acrylic-based pressure-sensitive adhesive polymer in combination with a reactive tackifier resin which, on electron beam or actinic radiation such as UV radiation cross-links with the acrylic polymeric backbone to provide high adhesive and cohesive strengths as well as excellent high temperature performance.

The reactive tackifiers of this invention have vinyl functionality. They are obtained by reacting a vinyl functional monomer having at least one additional group for further reaction along with a polymerizable double bond with a precursor polycyclic resin containing groups preferably having hydroxyl, carboxyl or amino functionality.

The reactive vinyl functional tackifier is then mixed with an acrylic pressure-sensitive adhesive polymer, presently preferred to be a solution polymer, and radiation cured. Electron beam curing the mixture at electron beam dosage levels up to 50 kGy and as low as 20 kGy provides high-performance adhesives. The resultant pressure-sensitive adhesive can be made into a laminated tape as such, including transfer tapes, or serve as a skin adhesive for double-coated foam tapes having an excellent balance of peel adhesion and shear properties to stainless steel as well as to urethane paint surfaces at ambient and elevated temperatures.

The reactive tackifiers provided in accordance with the present invention are polycyclic compounds having a pendant group providing vinyl functionality. Generally compounds having 3 to 5 rings may be employed with 3 ring groups presently, preferred. Preferably, the reactive tackifiers- are prepared from rosin precursor resins such as abitol, rosin acid, rosin amine, glycerol esters of rosin acid having free hydroxyl groups, pentaerythritol esters of rosin acid having free hydroxyl groups, phenolic resins or terpene phenolic resins having free hydroxyl groups, phthalate ester of abitol having free carboxyl groups and the ethylene glycol or polyethylene glycol treated rosin esters with free hydroxyl groups and the like.

These precursor rosin based resins may be characterized as having the general formula:

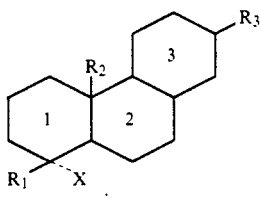
1 where the rings 2 and 3 can be either saturated or unsaturated as revealed in the following structures:

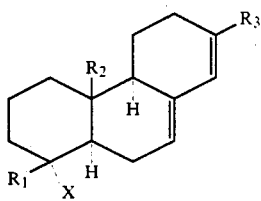
2

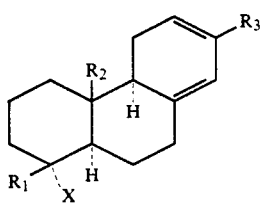
3

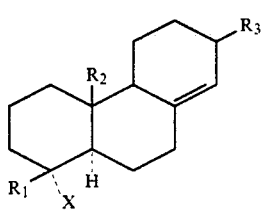
4

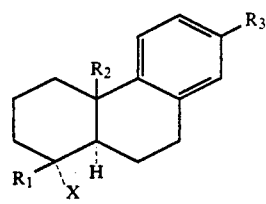
6

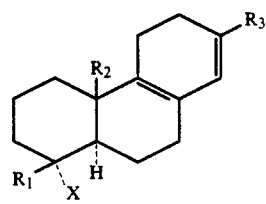
5

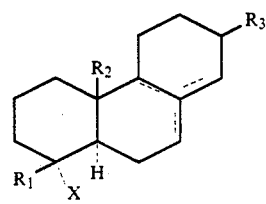
7

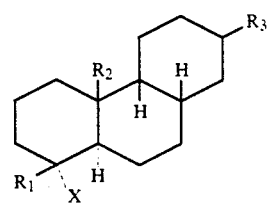
8 and mixtures thereof, wherein $R_1$ and $R_2$ are independently —H, or an alkyl group containing from 1 to about 4 carbon atoms with methyl preferred;

$R_3$ is isopropyl; and wherein

X=—$R_n'$CH$_2$OH,—$R_n'$COOH,—NH$_2$, or —$R_n'$CH$_2$OCOC$_6$H$_4$COOH wherein R' is an alkyl group; and n is of an integer being a value of 0 or 1.

X may also be any group reactive with a group providing vinyl functionality.

The preferred precursor resins of this invention are those having the structures (6), (7) or (8), as well as a mixture thereof.

The most preferred precursor resins used in this invention are abitol, rosin amine, and rosin acid, which have the respective structures:

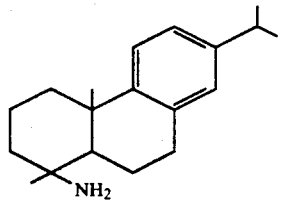

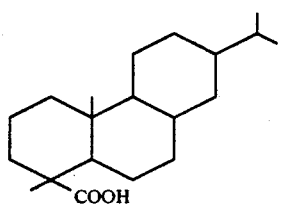

as conventional, wherein the group occupying the pendant lines are methyl.

Another class of precursor resins which can be used in the present invention are rosin esters formed by the partial esterification reaction products of any of the structures having carboxyl functionality with polyols where the reaction product contains residual hydroxyl groups for further reaction to add a vinyl functional group. The polyols which can react with rosin acids include, among others:

$$HO-CH(CH_3)-CH_2-OH.$$

$$HO-CH_2-CH_2-OH.$$

$$CH_2OH-CHOH-CH_2OH.$$

$$C-(CH_2OH)_4.$$

$$HO-(CH_2CH_2O)_m-H.$$

$$HO-(CH_2CH_2O)_m-(CH[CH_3]-CH_2-O)_p-H \text{ and the like,}$$

where m and p independently have a value of from 1 to about 10.

The rosin esters preferably used in the present invention are the glycerol ester of rosin acid having free hydroxyl groups and the terpene phenolic resin with free hydroxyl groups.

The reactive precursor resins are then reacted with vinyl functional monomers to provide a vinyl functional tackifier. The vinyl functional monomers which can be used to so modify the reactive precursor resins include isocyanato ethyl acrylate or methacrylate, acrylic acid, acryloyl chloride, glycidyl acrylate or methacrylate, hydroxy alkyl (meth)acrylates such as hydroxy ethyl or propyl acrylate and the like, as well as mixtures thereof. The preferred monomers are isocyanato ethyl methacrylate and acrylic acid.

The reactive tackifier formed has the general structure:

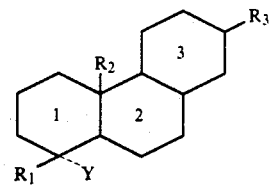

wherein rings 2 and 3 are independently saturated or unsaturated, $R_1$, $R_2$ and $R_3$ are defined above and Y is a pendant group having the general formula:

$CH_2=C(R_4)-Z$, wherein:

$R_4=-H$ or $-CH_3$;

$Z=-COO-CH_2-$; $-COO-CH_2-CH_2-NH-COO-CH_2-$; $-COO-CH(CH_2O)_2-(CO)_2-$; $-COO-(CH_2-CHR_5-O)_q-CO$ or $-COO-CH_2-CH_2-NH-CO-NH$ and wherein:

$R_5=-H$ or $-CH_3$ and q is an integer.

The acrylic based adhesive polymers, which are tackified according to the instant invention, have a glass transition temperature less than about 0° C., preferably less than about −20° C., and comprise one of the polymerized acrylic monomers of which there may be mentioned "soft monomers", such as butylacrylate, 2-ethyl hexyl acrylate, isooctylacrylate, and the like. These monomers typically have, when homopolymerized, a glass transition temperature of less than about −25° C. and entanglement molecular weight greater than about 20,000 and comprise from about 50 to about 90% by weight of the total monomers. Other monomers which can be used include alkyl esters of unsaturated dicarboxylic acids, containing from 2 to about 8 carbon atoms such as dibutyl fumarate, dibutyl maleate and the like.

There may be and desirably also provided one or more hard monomers having homopolymerization glass transition temperatures greater than about −25° C. and entanglement molecular weights less than about 20,000. They include among others, alkyl methacrylates such as methylmethacrylate and the like, copolymerizable vinyl unsaturated monomers such as vinyl acetate, styrenic monomers such as styrene and the like, and unsaturated carboxylic acids such as acrylic acid, methacrylic acids, fumaric and itaconic acid and the like. Acrylic acid is preferred and is normally present in an amount of from about 10% by weight, preferably about 1% to about 10% by weight of the monomers and is functional to enhance adhesion to high energy surfaces.

Other monomers which may be present are diesters of unsaturated dicarboxylic acids in which each alkyl group of the diester independently contains from 4 to about 8 carbon atoms. Diesters of fumaric acid and maleic acid are preferred. Also useful are isomeric acrylates such as tert-butyl acrylate, isopropyl acrylate and the like, and methacrylates such as normal or tert-butyl methacrylates and the like.

The polymer may also contain up to about 0.5% by weight of a multifunctional monomer having an epoxy and a vinyl functionality such as glycidyl acrylate or methacrylate to provide a dual cure system which can improve shear adhesion failure temperature (SAFT).

The present preferred monomer combination contains on a parts, by-weight basis, about 56 parts 2-ethyl hexyl acrylate, about 36 parts butyl acrylate, about 10 parts acrylic acid, and about 0.1 part glycidyl methacrylate.

The novel tackifiers of this invention may be added to the formed polymer and grafted through the vinyl group to the polymer chain by irradiation or combined with monomers or prepolymers and interpolymerized with the monomers or prepolymers to become an integral part of the polymer chain.

The chemically modified functional resins having vinyl functionality are mixed with the pressure-sensitive polymer in tackifying amounts, generally up to about 50% by weight based on the polymers and tackifiers, and are preferably irradiated with electron beam to give good balance of tack, peel and shear properties even at 70° C. with outstanding peel adhesion to stainless steel and polyurethane based automotive paint systems. The preferred composition has a tackifier content of from about 10 to about 20% by weight resin which requires only a 20 kGy dose of electron beam radiation to give high performance as compared to normal case which needs 50 and higher kGy dosage. In any event the amount used is based on polymer type and properties desired.

EXAMPLE 1

Polymer Preparation

An acrylic pressure-sensitive adhesive useful in the present invention was prepared by charging to a two liter jacketed glass reactor fitted with a condenser, a stainless steel blade stirrer, nitrogen inlet and monomer with a solvent mixture containing 36 g of hexane and 110 g of ethyl acetate. The reactor was heated to reflux the solvents (about 75° C.). At reflux, 146 g of the monomer charge consisting of 323 g of 2-ethyl hexyl acrylate, 216 g of butyl acrylate, 60 g of acrylic acid, and 0.37 g of Vazo 64 was added followed by an additional 0.37 g of Vazo 64, manufactured and sold by dupont. When the viscosity of the solution increased, the remaining monomer charge was fed over a period of two hours maintaining the temperature at 75° C. After the end of monomer feed, a solvent mixture containing 36 g of hexane, and 110 g of ethyl acetate was fed over 0.5 hr. After one hour of mixing, 0.36 g of Vazo 64 in 75 g of isopropyl alcohol was fed for 0.25 hr. Stirring was continued for one hour and then the polymer was cooled and discharged. The polymer had a solids content of 56.9%.

EXAMPLE 2

Preparation of Abietyl Ethyl Methacryl Carbamate

To a dry round-bottomed flask fitted with teflon blade stirrer, condenser and a nitrogen inlet, was added 88 g (0.30 moles) of abitol manufactured and sold by Hercules Inc. After purging the flask with nitrogen for 15 min., the alcohol was heated to 60° C. with stirring, and isocyanato ethyl methacrylate 44 g (0.285 mole) was added from a dropping funnel dropwise over a period of 0.5-0.75 hr. while maintaining the exotherm between 5°-7° C. The reaction was monitored by IR spectra for the complete disappearance of NCO band at 2280 wavenumber and the disappearance of OH band at 3340 wavenumber and the formation of NH band at 3360-3380 wavenumber. The stirring was continued for another two hours, and the contents were vacuum stripped to remove residual reactants, cooled, discharged and stored with 100 ppm of methyl ether of hydroquinone. The IR and NMR ('H, C-13) were indicative of 96-98% conversion.

EXAMPLE 3

Preparation of Abietyl Acrylate

Using the apparatus of Example 2, there was added 149 g (0.5 mole) of abitol, 145 ml of toluene, 0.16 g of copper powder and 4 g of p-toluene sulfonic acid and heated to reflux. Acrylic acid 43.2 g (0.6 mole) was added dropwise over a period of 0.5-0.45 hr. under nitrogen purge. Reflux was continued until the required amount of water was collected in a Dean and Stark trap. The product was cooled, filtered and extracted twice with 5% NaOH, washed with 5% NaCl followed by water. The extract was dried over $MgSO_4$ and the solvent was evaporated under vacuum. The IR spectra was indicative of the disappearance of the —OH band the —COOH band and the formation of the ester carbonyl (—CO) band at 1720 wavenumber.

EXAMPLE 4

Preparation of Ethyl Methacryl Carbamate of Rosin Ester

The procedure of Example 2 was again repeated by using Zonester 85, a glycerol ester of rosin acid, 66.4 g and isocyanato ethyl methacrylate (15.5 g in 70 ml of toluene). The reaction temperature was about 85°-90° C. The IR was indicative of some unreacted isocyanate.

Example 5 and Control 1

The polymer of Example 1, 100 g (56.9% solids) was mixed with 7.7 g of the resin of Example 2. The solids content of the polymer was reduced to 50% by toluene or methyl ethyl ketone. The formulated adhesive was coated on a 2 mil thick polyester film, dried at 70° C. for 10-15 min. and was subjected to electron beam radiation at 20 kGy. The sample was tested for loop tack, 180 deg. peel, room temperature shear and 70° C. shear. The control involved identical curing and testing without the resin. Table 1 gives the properties of Example 5 and the Control. As can be seen, the Examples 5 give higher peel adhesion to stainless steel with outstanding shear properties even at elevated temperature. The samples were subjected to two weeks aging at 70° C. As evidenced from the data from Table 1, Example 5 shows good adhesion even after aging.

Example 6 and Control 2

The polymer resin blend from Example 5 was coated on Supertuf release liner at 50-60 $g/m^2$ coat weight and was EB cured at 20 kGy. A double coated foam tape construction was made by applying the cured adhesive onto a double faced acrylic foam tape as a skin adhesive layer. One side of the construction was laminated onto 2 mil soft aluminum and the other side to the substrate of the test. As Control 2, a similar construction was made with only the polymer. Example 6 again showed excellent peel adhesion to stainless steel and polyurethane automotive painted panel with higher SAFT values compared to Control 2 without the functional resin.

TABLE 1

| Physical Properties of the Adhesive With and Without the Functional Resin | | | |
|---|---|---|---|
| L. Tack N/m, 20 min | N/m 180° Peel N/m, 24 hr. | RTS 1 Kg., min | 70 C. Shear 1 Kg., min |
| Initial | | | |

TABLE 1-continued

| | L. Tack N/m. 20 min | N/m 180° Peel N/m. 24 hr. | RTS 1 Kg., min | 70 C. Shear 1 Kg.. min |
|---|---|---|---|---|
| Physical Properties of the Adhesive With and Without the Functional Resin | | | | |
| Example 5 | 700 | 1100 | 10000+ | 10000+ |
| Control 1 | 800 | 900 | 5900 | 290 |
| Aged Two Weeks at 70° C. | | | | |
| Example 5 | 740 | 840 | 10000+ | 10000+ |
| Control 1 | 700 | 750 | 6400 | 4700 |

Coated on mylar at 55-60 g/m² coat weight and laminated with FEP liner.
Substrate = stainless steel.
Loop Tack = PSTC. 6th Ed.. Test No. 5, time is dwell time
180° Peel = PSTC. 6th Ed.. Test No. 1. time is dwell time
RTS = Room Temperature Shear = PSTC: 6th Ed.. Test No. 6.
70° C. Shear = The pressure sensitive adhesive tape backed by aluminum foil of the size 12.7 mm × 25.4 mm is applied to a stainless steel shear panel. The sample is rolled twice. once in each lengthwise direction with a 5 lb. roller. After 24 hr. dwell at room temperature. the assembly is placed in an oven at 70° C. for 15 minutes. After 15 minutes, a 1000 g. weight is hung from the free end of the tape. The time interval at which the weight falls is noted in minutes , along with the mode of failure. The test is discontinued if the sample does not fall after 10,000 minutes.

TABLE 2
Performance Properties of Double Coated Foam Construction

| Property | Example 6 | Control 2 |
|---|---|---|
| 180 deg. Peel on SS 24 hr dwell N/m | 3500+ Sample broke | 2800 |
| 180 deg. Peel on PU 72 hr dwell N/m | 2600 | 2100 |
| SAFT. °C. | 156 | 139 |

SS = Stainless Steel
PU = Polyurethane painted automotive paint panel
Example 6 and Control 2 were coated on Supertuf release liner and transfer coated to both sides of a foam tape core consisting essentially of 71.5 volume percent of an acrylic pressure sensitive adhesive. 15 volume percent of glass microballoons PM-6274 manufactured by PQ Corporation and 12 volume percent of ceramic microspheres SF-14. manufactured by PA Industries. 0.5 volume percent carbon black and 1 volume percent of fumed silica (Cabosil M-5). manufactured by Cabot Corporation. T he core layer was cured at 50 kGy. Each coat level was at 60-65 g/m².

What is claimed is:

1. A reactive tackifier which is reactive with acrylic based, pressure-sensitive adhesive polymers having a glass transition temperature less than 0° C. under the action of electron beam or actinic radiation, said reactive tackifier having the formula:

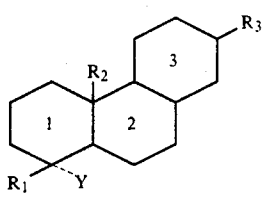

wherein rings 2 and 3 are independently saturated or unsaturated; $R_1$ and $R_2$ are independently —H or an alkyl group containing from 1 to about 4 carbon atoms, $R_3$ is isopropyl and Y is a pendant vinyl unsaturated organo group of the formula:
CH$_2$=C(R$_4$)—Z, wherein:
R$_4$=—H or —CH$_3$;
Z=—COO—CH$_2$—CH$_2$—NH—COO—CH$_2$—.

2. A reactive tackifier which is reactive with acrylic based pressure-sensitive adhesive polymer having a glass transition temperature less than 0° C. under the action of electron beam or actinic radiation, said tackifier having the formula:

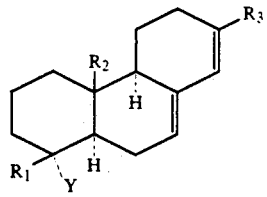
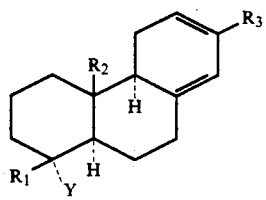
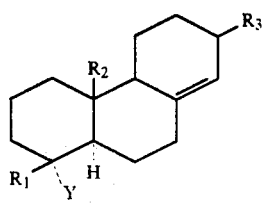
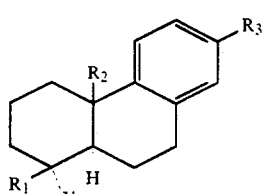
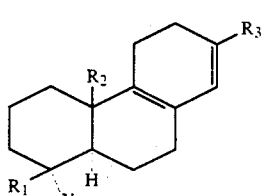
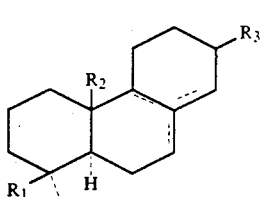
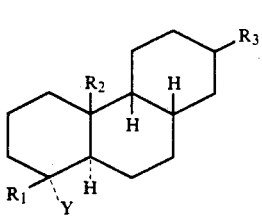

and mixtures thereof, wherein $R_1$ and $R_2$ are independently —H or an alkyl group containing from 1 to about 4 carbon atoms, $R_3$ is isopropyl and Y is a pendant vinyl unsaturated organo group of the formula:
CH$_2$=C(R$_4$)—Z, wherein:
R$_4$=—H or —CH$_3$;
Z=—COO—CH$_2$—CH$_2$—NH—COO—CH$_2$—.

3. Abietyl ethyl methacryl carbamate.

* * * * *

UNITED STATES PATENT AND TRADEMARK OFFICE
CERTIFICATE OF CORRECTION

PATENT NO. : 5,248,808
DATED : September 28, 1993
INVENTOR(S) : Margaret M. Bernard et al It is certified that error appears in the above-indentified patent and that said Letters Patent is hereby corrected as shown below:

Column 1, line 42, change "4,377,513" to -- 4,377,510 --.
Column 2, line 25, change "independently-H" to -- independently -H --.
Column 2, line 34, change "—COO—(CH2—CHR$_5$—O)$_n$—CO;" to -- —COO—(CH$_2$—CHR$_5$—O)$_n$—CO; --.
Column 3, lines 13,14, after "Generally" insert a comma.
Column 3, line 16, after "tackifiers" delete the hyphen.
Column 6, line 18, change "—COO—(CH2—CHR$_5$—O)$_q$—CO" to -- —COO—(CH$_2$—CHR$_5$—O)$_q$—CO --.
Column 7, line 18, before "case" insert -- a --.
Column 7, line 36, change "dupont" to -- du Pont --.
Column 9, line 38, before "core" change "T he" to -- The --.

Signed and Sealed this

Eighteenth Day of April, 1995

Attest:

BRUCE LEHMAN

*Attesting Officer*

*Commissioner of Patents and Trademarks*